United States Patent
Moore

(10) Patent No.: US 10,615,831 B1
(45) Date of Patent: Apr. 7, 2020

(54) SMART MOUNT DEVICE AND SYSTEM

(71) Applicant: Rockwell Collins, Inc., Cedar Rapids, IA (US)

(72) Inventor: Daniel I. Moore, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/247,731

(22) Filed: Jan. 15, 2019

Related U.S. Application Data

(60) Provisional application No. 62/742,801, filed on Oct. 8, 2018.

(51) Int. Cl.
*H04B 1/3822* (2015.01)
*H04B 7/185* (2006.01)

(52) U.S. Cl.
CPC ....... *H04B 1/3822* (2013.01); *H04B 7/18506* (2013.01)

(58) Field of Classification Search
CPC .......................... H04B 1/3822; H04B 7/18506
USPC ......................................................... 455/90.3
See application file for complete search history.

(56) References Cited

U.S. PATENT DOCUMENTS

| | | | | |
|---|---|---|---|---|
| 6,665,189 B1* | 12/2003 | Lebo | .................... | H01R 13/514 211/41.17 |
| 2004/0052368 A1* | 3/2004 | Spring | ................. | H05K 7/1412 380/52 |
| 2008/0037218 A1* | 2/2008 | Sharma | ................ | H05K 7/1424 361/695 |
| 2009/0311974 A1* | 12/2009 | Nelson | ..................... | H04B 1/38 455/90.2 |
| 2015/0062831 A1* | 3/2015 | Perkins, III | .......... | H05K 5/0086 361/729 |
| 2016/0262290 A1* | 9/2016 | Chen | ........................ | F28F 3/04 |

OTHER PUBLICATIONS

DSL Data Link Solutions, Improving Mission Effectiveness with Link 16 Networking, http://milas-tweenty_squarespace.com/s/1-9a.pdf,Decennber 8, 2013, pp. 1-9. (Year: 2013).*

* cited by examiner

*Primary Examiner* — Edward F Urban
*Assistant Examiner* — Angelica M Perez
(74) *Attorney, Agent, or Firm* — Suiter Swantz pc llo

(57) ABSTRACT

A smart radio mount device, system, and method adds an independent smart radio mount configured to mechanically couple with an avionics tray as well as with a radio to add an additional waveform capability to a platform to which the smart radio mount is coupled. The smart radio mount device adds capability to the existing platform communication suite to incorporate a second, independent radio channel and second power amplifier instead of developing a separate radio. The smart radio mount uses empty space available proximal with an existing radio and radio mount to add the full capabilities of the additional waveform with minimal space increase retaining all original radio capabilities.

16 Claims, 14 Drawing Sheets

TSM Waveform

Infrastructure-less MANET
- High-speed wireless IP networking
- Self-forming, self-healing
- Scalable to 200+ nodes
- Robust in harsh environments
- Non-routing network
- AES-256 encryption
- Licensed EAR for export

| | |
|---|---|
| Frequency Range | 1775–1815 MHz, 2200–2250 MHz |
| Occupied Bandwidth | 20 MHz, Configurable to 4 MHz |
| IP Support | IPv4, IPv6; Unicast, Multicast, Broadcast, TCP, UDP |
| Data Rate | 8 Mbps IP Throughput per Channel |
| Audio Encoding | AMR 5.9 or MELPe, Up to 12 Channels |
| Audio Latency | 3 Hop < 275 ms; 8 Hop < 400 ms |
| Net Entry Time | < 1 Second |
| Waveform | TSM |
| Routing | Barrage Relay™ networking |
| Modulation | Constant Envelope |

Network Coverage
- Mobile Ad-hoc Networking (MANET)
- Range – 26 Mile LOS per Network Hop
- Multi-hop – Up to 8 Hops
- 200+ Nodes in a Single RF Channel
- Robust in Harsh RF Environments

Communication Services
- Simultaneous Voice, Data, PLI
- 12+ Cellular Quality Voice Channels
- Up to 12 Real-time Video Streams
- Built-in GPS
- IP Support – IPv4, IPv6: Unicast, Multicast, Broadcast, TCP, UDP

Security
- AES-256
- OTAR, OTAZ
- Remote Disable
- RSA-2048
- SHA-256

Application Support
- Built-in Web Applications
- Over the Air Remote Control
- APIs for 3rd Party Integration
- PLI with CoT, KML, and JSON
- Integration with Android™

ARC-210 Gen 6 Radio Capabilities

Functionality and capability

- Ethernet data and control
- VMF – Includes MIL-STD-188-220B/C/D(ch1)
- Modernized Embedded Encryption
  - TSV – Tactical Secure Voice encryption, V2
  - KY-58, KY-100 (KY-58 & ANDVT support), KYV-5, KG-84A/C, KGV-11, KGV-10
  - Medley/AES
  - SCIP Crypto
  - HAIPE Crypto
  - NSA Type 1 certification to Top Secret
- JPALS – Joint Precision Approach Landing System

- 30 – 1850 MHz operation
  - Land Mobile Mode
  - Civil Interoperability
- VULOS w/ ATC 8.33kHz & ED-23C
- HaveQuick I/II
- SATURN Ed3
- SINCGARS/ESIP
- FM Immunity
- Link-4A/Link-11
- USAF Situational Awareness
- SATCOM: Dedicated/DAMA/IW/MUOS

Common Attributes

- Form Factor (5.0 x 5.6 x 9.85 inches), Max weight (12.2 lbs), Same form/fit as Gen 3/4/5...but more powerful functions
- Common set of ancillaries; Connector configuration common for all embedded COMSEC RTs
- Gen 6 Crypto being certified for Top Secret traffic

FIG. 7

| Item | DLS – TTR | TTR (SFF Link 16) ViaSat – STT |
|---|---|---|
| Environmental and EMI | MIL-STD 810F and MIL-STD 461 Sealed box (no sand/dust entrance) | MIL-STD 810F (humidity/shock/vibe) Vented box (dust/sand filters/EMI) |
| Water Resistance | Yes | No |
| Size | 2,967 cm3 / 182 in3 | 5,031 cm3 / 308 in3 |
| Weight | 4.5 kg / 10.4 lbs | 7.5 kg / 16.5 lbs |
| Power Output | 1W-50W-90W | 63W |
| Second Channel (if required/used) | None | 5W Radio |
| Cooling/Noise | Free convection – No cold plate or fan required along with No noise | Forced convective cooling (fan) and/or cold plate cooling required |
| NSA Certified Security Level | TOP SECRET (as with LVT and MIDS-J) | SECRET |
| Contested Environment Performance (Anti-Jam) | Superior as tested (USAF-TTG program) | Recommend reading test reports from 46th Test Squadron (USAF-TTG) |
| Cost (terminal only) | ~$84-90K + support equipment | ~$110-180K + equipment + wave forms |
| Time to Market | Second to market (TS & 3 Power Outs) Being produced now | First to market |

FIG. 8

902 — CONFIGURING A SMART RADIO MOUNT TO MECHANICALLY COUPLE WITH EACH OF A RADIO MOUNT AND A RADIO

904 — COUPLING THE SMART RADIO MOUNT WITH THE RADIO MOUNT AND THE RADIO, THE SMART RADIO MOUNT INCLUDING A TRANSCEIVER AND A POWER AMPLIFIER, THE TRANSCEIVER CONFIGURED FOR TRANSMISSION AND RECEPTION WITHIN ONE OF: A WAVEFORM DISTINCT FROM AT LEAST ONE WAVEFORM CAPABILITY OF THE RADIO, AND A WAVEFORM SIMILAR TO THE AT LEAST ONE WAVEFORM CAPABILITY OF THE RADIO

FIG. 9

SMART MOUNT DEVICE AND SYSTEM

CROSS-REFERENCE TO RELATED APPLICATIONS

The present application claims the benefit under 35 U.S.C. § 119(e) of U.S. Provisional App. No. 62/742,801 (filed Oct. 8, 2018), which is incorporated herein by reference in its entirety.

BACKGROUND

Secure communications may be of great value for a combat force. On occasion, a field commander may need to modify user capabilities to maintain a secure line of communications. One such secure line of communications may include a network known as a Tactical Scalable Mobile Ad hoc NETwork (TSM MANET).

Military users may require an ability to quickly add or prototype an additional waveform to a fielded system which uses an existing radio. Current systems may be static once loaded within an airframe. Such static systems may limit the field commander's ability to modify in-use systems and enhance capabilities.

Therefore, a need remains for a device and related system to reliably add a TSM waveform to an existing radio thereby increasing a field commander's capability to successfully complete a mission.

SUMMARY

Accordingly, a device for adding a waveform to a communications suite may comprise a smart radio mount configured to mechanically couple, on a smart radio mount lower face, with a radio mount and further configured to mechanically couple, on a smart radio mount upper face, with a radio. In embodiments, the smart radio mount may include a transceiver, a data interface, and a power amplifier, the transceiver configured for transmission and reception within a waveform, the waveform distinct from at least one waveform capability of the radio.

In one embodiment of the inventive concepts disclosed herein, a system for multi-channel tactical radio networking may comprise a smart radio mount configured to mechanically couple, on a smart radio mount lower face, with a vehicle radio mount and further configured to mechanically couple, on a smart radio mount upper face, with a radio. Here, the radio may maintain a portion of a vehicle communication suite and the smart radio mount may include a transceiver, a data interface, and a power amplifier, the transceiver configured for transmission and reception within a waveform distinct from at least one waveform produced by the vehicle communication suite.

In one embodiment of the inventive concepts disclosed herein, a method for multi-channel tactical radio networking may comprise configuring a smart radio mount to mechanically couple with each of a radio mount and a radio and coupling the smart radio mount with the radio mount, the smart radio mount including a transceiver and a power amplifier, the transceiver configured for transmission and reception within a waveform distinct from at least one waveform capability of the radio.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIG. 5 is a diagram of TSM waveform characteristics usable by a smart radio mount in accordance with one embodiment of the inventive concepts disclosed herein;

FIG. 7 is a diagram of capabilities of an ARC-210 couplable with a smart radio mount associated with one embodiment of the inventive concepts disclosed herein;

FIG. 8 is a diagram of TTR capabilities usable by a smart radio mount exemplary of one embodiment of the inventive concepts disclosed herein; and FIG. 9 is a flow diagram of a method for multi-channel tactical radio networking associated with one embodiment of the inventive concepts disclosed herein.

DETAILED DESCRIPTION OF EXEMPLARY EMBODIMENTS

Figure 1A:
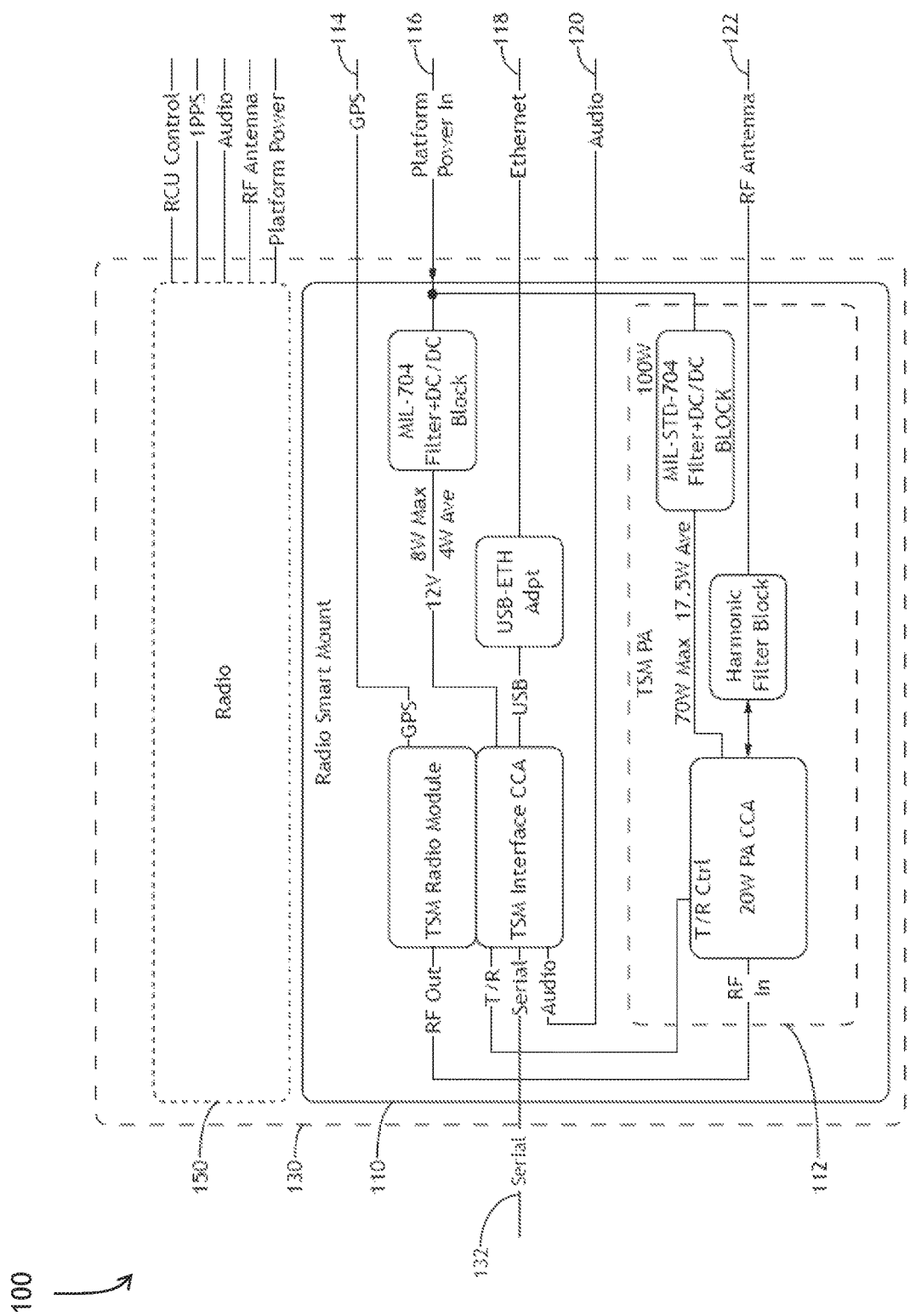
FIGS. 1A and 1B are block diagrams of a smart radio mount in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

However, the inventive concepts disclosed herein may be embodied in a multitude of different ways as defined and covered by the claims. In this description, reference is made to the drawings wherein like parts are designated with like numerals throughout.

OVERVIEW

Broadly, embodiments of the inventive concepts disclosed herein are directed to a smart radio mount device, system, and method adds an independent smart radio mount configured to mechanically couple with an avionics tray as well as with a radio to add an additional waveform capability to a platform to which the smart radio mount is coupled. The smart radio mount device adds capability to the existing platform communication suite to incorporate a second, independent radio channel and second power amplifier instead of developing a separate radio. The smart radio mount uses empty space available proximal with an existing radio and radio mount to add the full capabilities of the additional waveform with minimal space increase retaining all original radio capabilities.

Reference Chart

| 100 | Block Diagram | 230 | Processor |
|---|---|---|---|
| 110 | Smart Radio Mount | 232 | Input Output |
| 112 | Power Amplifier | 234 | Storage |
| 114 | GPS input | 236 | Memory |

-continued

Reference Chart

| 116 | Power Receptacle | 238 | Connectivity Suite |
|---|---|---|---|
| 118 | Ethernet | 244 | Radio Interface Card |
| 120 | Audio Connection | 250 | Length |
| 122 | RF Antenna Connection | 252 | Width |
| 124 | MIL STD 1553 Connection | 254 | Height |
| 126 | USB Connection | 300 | Smart Radio Mount View |
| 128 | WI FI Connection | 310 | Smart Radio Mount Upper Face |
| 130 | Smart Mount System | | |
| 132 | Serial Connection | 312 | Smart Radio Mount Lower Face |
| 150 | Radio | | |
| 200 | Lower Perspective View | 320 | Captive Retention Screws |
| 210 | External Case | 322 | Alignment Pin |
| 212 | 12 V DC Power | 324 | Spring Retainers |
| 214 | Single Board Computer | 400 | Radio Mounted |
| 216 | Power Amplifier | 500 | TSM Waveform |
| 218 | Adapter Ethernet USB | 600 | Radio Types |
| 220 | Data Control Interface | 700 | Capabilities of ARC-210 |
| 222 | Filter | 800 | Characteristics of TTR |
| 224 | TSM Radio Module | 900 | Method |
| 226 | Fuse | | |
| 228 | 28 V DC Power | | |

Figure 1B:
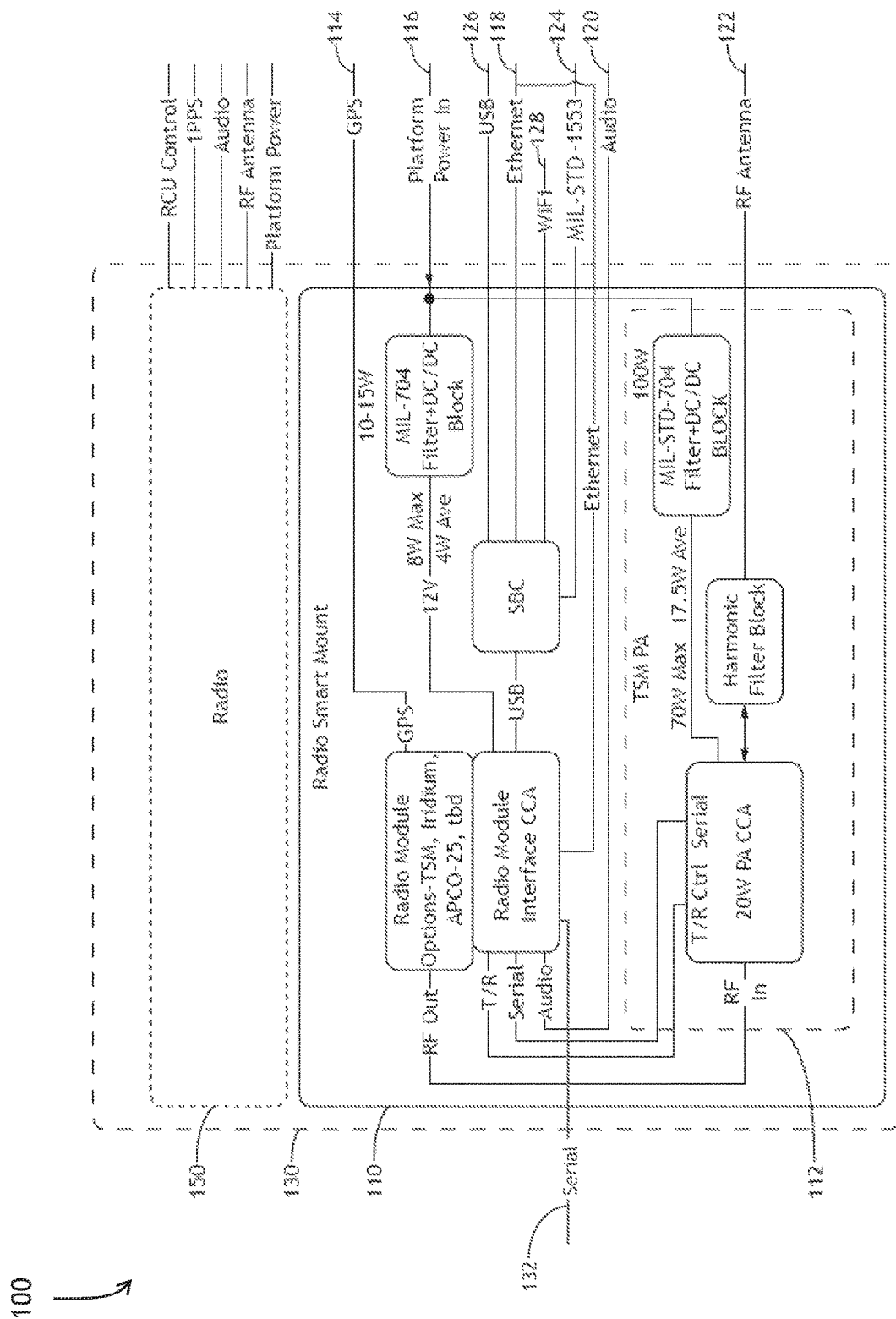

FIGS. 1A and 1B Overview

Referring to FIGS. 1A and 1B, block diagrams of a smart radio mount in accordance with an embodiment of the inventive concepts disclosed herein are shown. A block diagram 100 may indicate some of the components of the inventive concepts disclosed herein. A smart mount system 130 may include a radio 150 and a smart radio mount 110. The smart radio mount 110 may be configured to couple either mechanically and/or electrically or both with the radio 150. With the smart radio mount 110 coupled, the smart radio mount 110 may integrate a waveform distinct from and in addition to existing capabilities of the radio.

In one embodiment of the inventive concepts disclosed herein, the smart radio mount 110 may add or complement a waveform to a communications suite. The smart radio mount 110 may mechanically couple, on a smart radio mount lower face, with a radio mount and further mechanically couple, on a smart radio mount upper face, with a radio 150. The smart radio mount 110 may include a transceiver, a data interface, and a power amplifier 112, the transceiver configured for transmission and reception within a waveform, the waveform distinct from at least one waveform capability of the radio 150.

In one embodiment of the inventive concepts disclosed herein, the waveform capability of the smart radio mount 110 may be distinct from a capability of the radio as well as a complement to the waveform of the existing radio. A smart radio mount 110 with a similar waveform as that found in the radio may offer an operator enhanced capability and range.

The smart radio mount 110 may be incorporated within a communications suite onboard a platform such as an aircraft. In addition, the smart radio mount 110 may be incorporated within a communications suite of a terrestrial vehicle and/or a fixed base for use in a surface-based communication station.

The smart radio mount 110 may incorporate the power amplifier 112, Global Positioning System (GPS) input 114, a power receptacle 116, an ethernet data connection 118, an audio connection 120 and a Radio Frequency (RF) antenna 122. It is contemplated herein, a GPS, a Global Navigation Satellite System (GNSS) and additional satellite-based positioning systems may provide function and be incorporated within the smart radio mount 110 to enable accurate positioning and timing input.

Power receptacle 116 may offer the smart radio mount 110 a source of electrical power for operation. It is contemplated herein, a desirable power source for smart radio mount 110 operation may be 28 volt (V) Direct Current (DC). Also contemplated herein, additional power sources and voltage (e.g. alternating current (AC) at 110 V, 12 V DC, etc.) may be incorporated within the scope of the inventive concepts disclosed.

Ethernet 118 may represent one data connection with the platform on which the smart radio mount 110 is incorporated. Serial connection 132 may operate as an additional data connection. Audio 120 may interface with the communications suite onboard the platform. RF antenna 122 may function as a two-way transfer of an RF signal between the smart radio mount 110 and an RF antenna.

The smart radio mount 110 may offer a separate composition of hardware on which the distinct waveform may operate offering an immediate use of the new waveform to an operator. In one example, the smart radio mount 110 may securely mount within an avionics bay of a terrestrial vehicle or aircraft and couple with a piloted Aircraft Radio Communications (ARC)-210 or TacNet Tactical Radio (TTR) Link-16 radios creating an additional waveform available to the operator.

In one embodiment of the inventive concepts disclosed herein, the smart radio mount 110 may incorporate interfaces for a specific implementation onboard the platform. One benefit of the smart radio mount 100 may include adding a full 20 W TSM Waveform capability to an existing ARC-210 or TTR with minimal Size Weight and Power (SWAP) increase thereby enhancing an overall capability of the communications suite onboard the platform. The smart radio mount 100 may enhance existing capabilities of a coupled radio, for example, either the ARC-210 or TTR radio into a multichannel system.

Figure 2A:
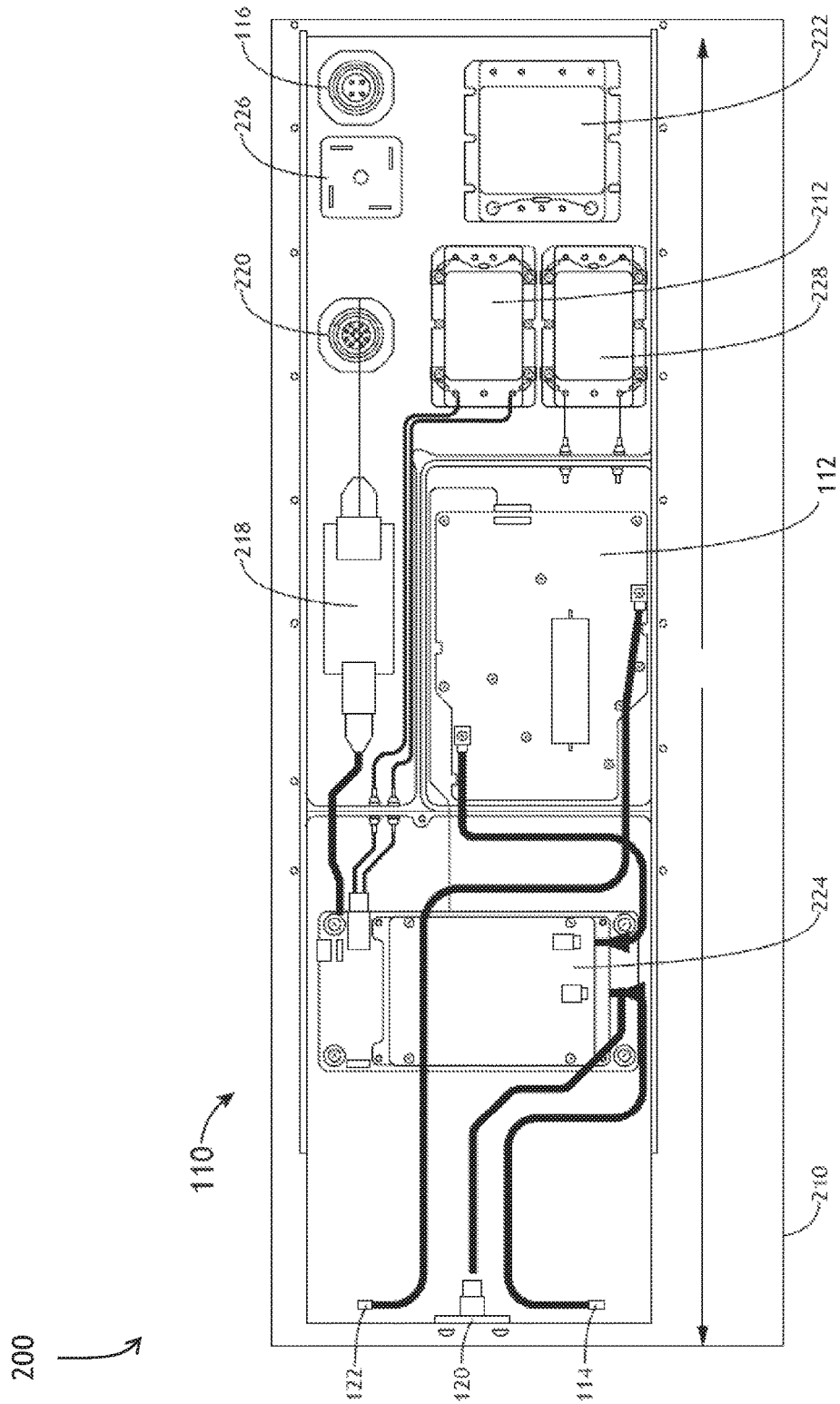
FIGS. 2A and 2B are lower perspective views of a smart radio mount in accordance with an embodiment of the inventive concepts disclosed herein.
Figure 2B:
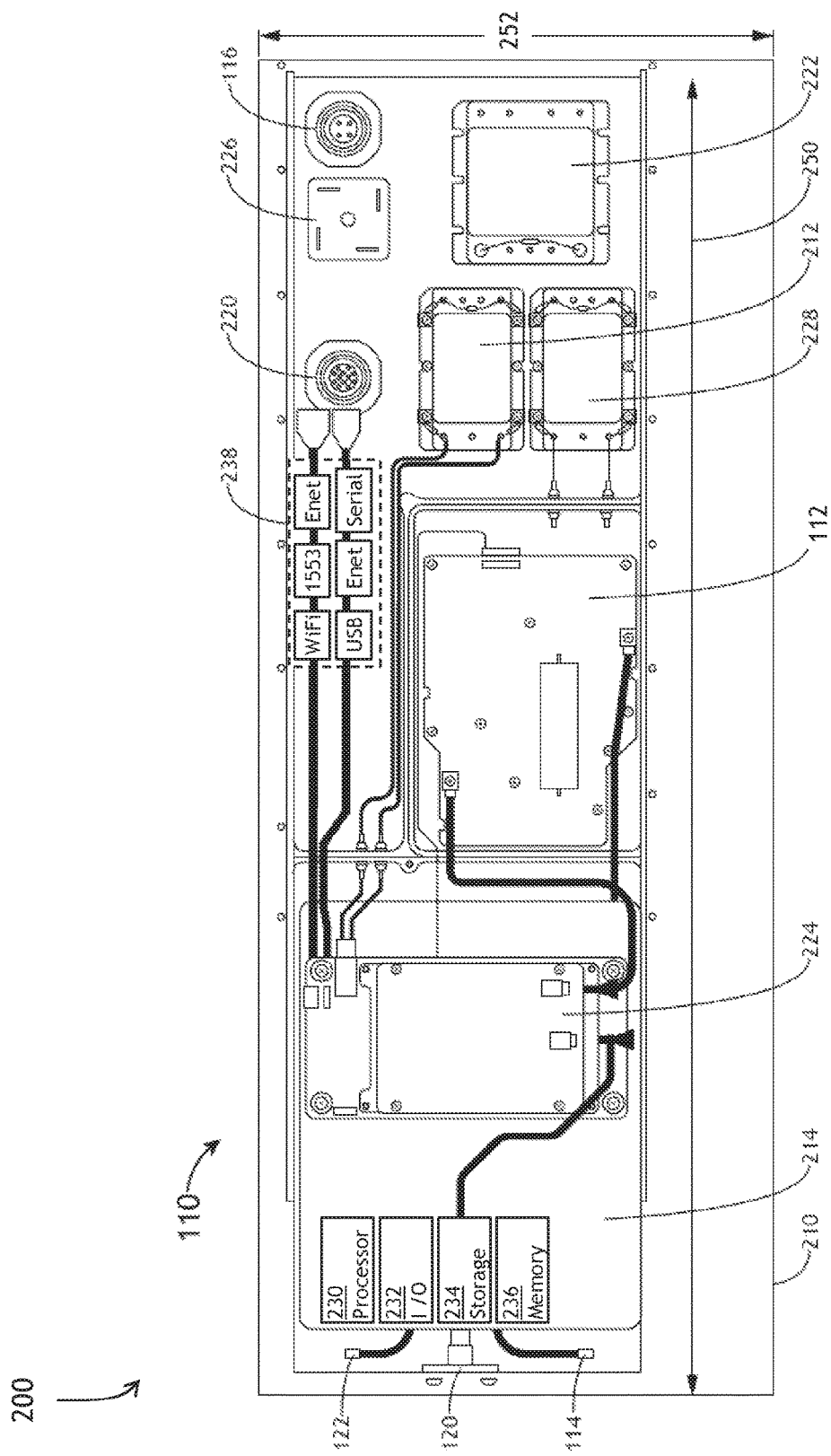

FIG. 1B may indicate additional capabilities of the smart radio mount 110 including a single board computer (SBC) discussed below (FIG. 2B). Additionally, the SBC may control each aspect of the smart radio mount 110 as well as direct communication with systems onboard the platform via a MIL STD 1553 interface 124, a Universal Serial Bus (USB) interface 126, and a WiFi interface 128. In addition, the SBC may function to apply additional commands based on an operator-designed set of instructions. In this manner, the SBC may be individually tailored to each specific operator.

FIGS. 2A and 2B Underside Perspective

Referring now to FIGS. 2A and 2B, a lower perspective views of a smart radio mount in accordance with an embodiment of the inventive concepts disclosed herein is shown. Each view of FIGS. 2A and 2B may be of an underside perspective 200 if a viewer was under the smart radio mount 110 and looking into smart radio mount 110 case from below. The smart radio mount 110 may be enclosed within an external case 210 for protection of the various components therein. The external case 210 may maintain an external dimension limited by available space within a mounting location (e.g., an aircraft avionics bay).

The external case 210 of the smart radio mount 110 may maintain an external dimension defined by a length 250, a width 252, and a height 254 (FIG. 3). In one exemplary embodiment of the inventive concepts disclosed herein, the external dimension of the smart radio mount 110 may be approximately 5.36 inches in width, 19.2 inches in length, and 2.11 inches height. It is contemplated herein, a smart radio mount 110 may be sized to nearly any size an operator may require to provide function to smaller and larger form factor installations.

External connections functional with the smart radio mount 110 may include the RF antenna connection 122, the audio connection 120, the GPS connection 114, a data control interface 220 and the power receptacle 116. Each of the GPS connection 114 and the RF antenna connection 122 may be internally functional as micro-miniature coaxial (MMCX) connections while maintaining external function as standard sized connections for traditional connectivity.

A radio module 224 may incorporate a variety of waveform capabilities within the smart radio mount 110. In addition to a plurality of waveforms desired by an operator, the radio module 224 may provide the smart radio mount 110 with a tactical scalable mobile ad hoc network (TSM) waveform, a satellite-based communication waveform (e.g., Iridium, Inmarsat, etc.), and a waveform designed for use by a public safety organization. In one embodiment of the inventive concepts disclosed herein, the smart radio mount 110 may employ a waveform compatible with an Iridium network via Distributed Tactical Communications System (DTCS). Here, the smart radio mount 110 employing the DTCS may offer the operator an ability to securely communicate with other users worldwide.

The radio module 224 may comprise a radio transceiver and interface card to both transmit and receive a desired waveform as well as interface with additional systems onboard the platform.

In one embodiment of the inventive concepts disclosed herein, the smart radio mount 110 may provide a satellite-based communication (SATCOM) waveform operational within a frequency band allocated to satellite communications (e.g., 3-40 GHz). The SATCOM waveform may enable an operator of the smart radio mount 110 to communicate via the desired satellite communications waveform.

The waveform designed for use by a public service organization may include a waveform in compliance with an Association of Public-Safety Communications Officials-International (APCO)-25 standard (e.g. at a frequency of 136 MHz-860 MHz). It is contemplated herein, the radio module 224 may be specifically configured for transmission and reception of additional optional waveforms outside of a security clearance scope of this paper.

The data control interface 220 may function as a standard connection externally compatible with the platform while providing internal connectivity to the radio module 224. In one embodiment, an adapter 218 may provide connectivity between the data control interface 220 and the radio module 224 via an adapter (e.g. a USB to Ethernet adapter).

Power receptacle 116 may provide the smart radio mount 110 with electrical power from the platform. Electrical power may flow via the fuse 226, through a filter 222 to each of a 28V DC power 228 and a 12V DC power 212 source able to power various requirements of the internal components. For example, the power amplifier 112 may require the 28V while the radio module 224 may require the 12V. In one embodiment of the inventive concepts disclosed herein, the power receptacle may be configured to receive a 28 VDC power supply rated for MIL-STD-704E/F. In an additional embodiment of the inventive concepts disclosed herein, the smart radio mount 110 is configured to operate independent of a power status of the radio 150.

FIG. 2B may reveal additional embodiments of the inventive concepts disclosed herein. The Single board computer 214 may include a processor 230, an input output 232, a storage 234, and a memory 236. Operatively connected with the radio module 224 the single board computer 214 may enable to smart radio mount 110 to produce enhanced waveforms compatible with other radio types (e.g. a software defined radio). In one embodiment of the inventive concepts disclosed herein, at least one characteristic of the waveform is generated by the processor 230.

The smart radio mount 110 may employ additional connectivity options to connect the radio module to other systems onboard the platform. Connectivity suite 238 may be fitted with the MIL STD 1553 interface 124, a Universal Serial Bus (USB) interface 126, a WiFi interface 128, the Ethernet interface 218, and a serial interface. With a possible exception of WiFi 128, each of the interface options within the connectivity suite 238 may operative connect with the platform via the data control interface 220. It is contemplated herein, the smart radio mount 110 may employ a wireless connection with the platform via the WiFi interface 128. In this manner, an operator may desire wireless connectivity between the platform and the smart radio mount 110.

Figure 3A:
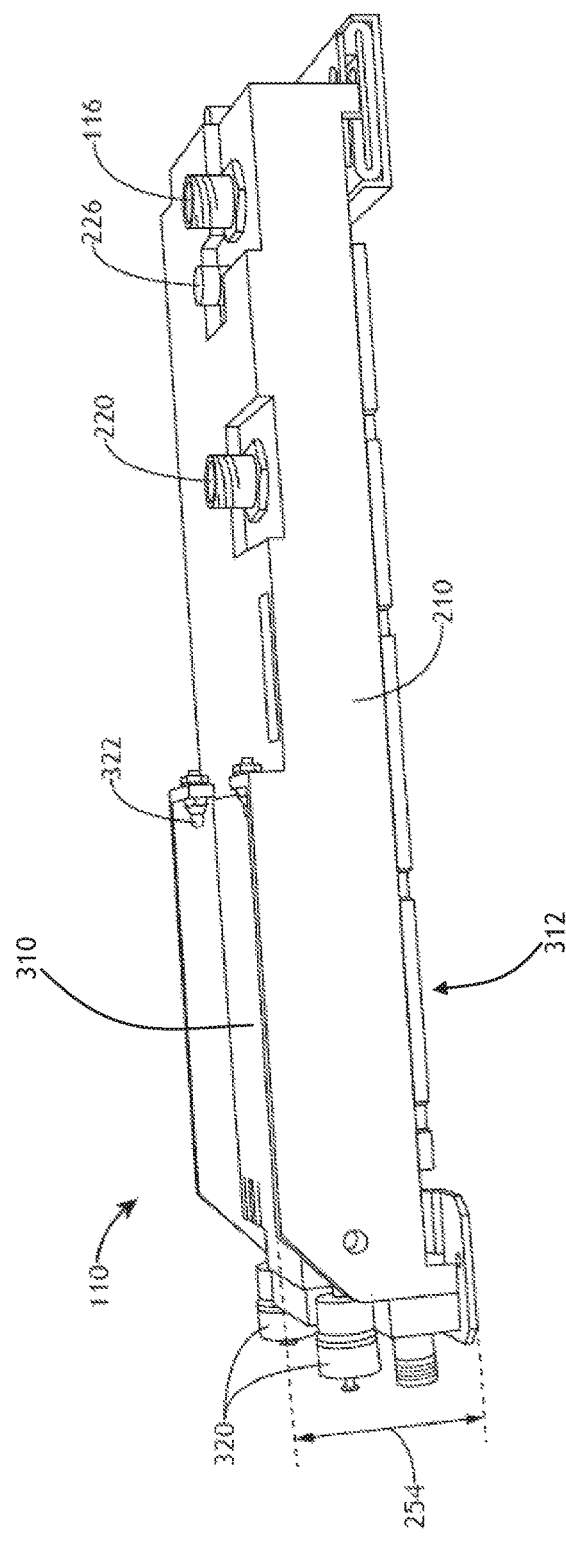
FIG. 3A-3C are views of a smart radio mount exemplary of an embodiment of the inventive concepts disclosed herein.
Figure 3B:
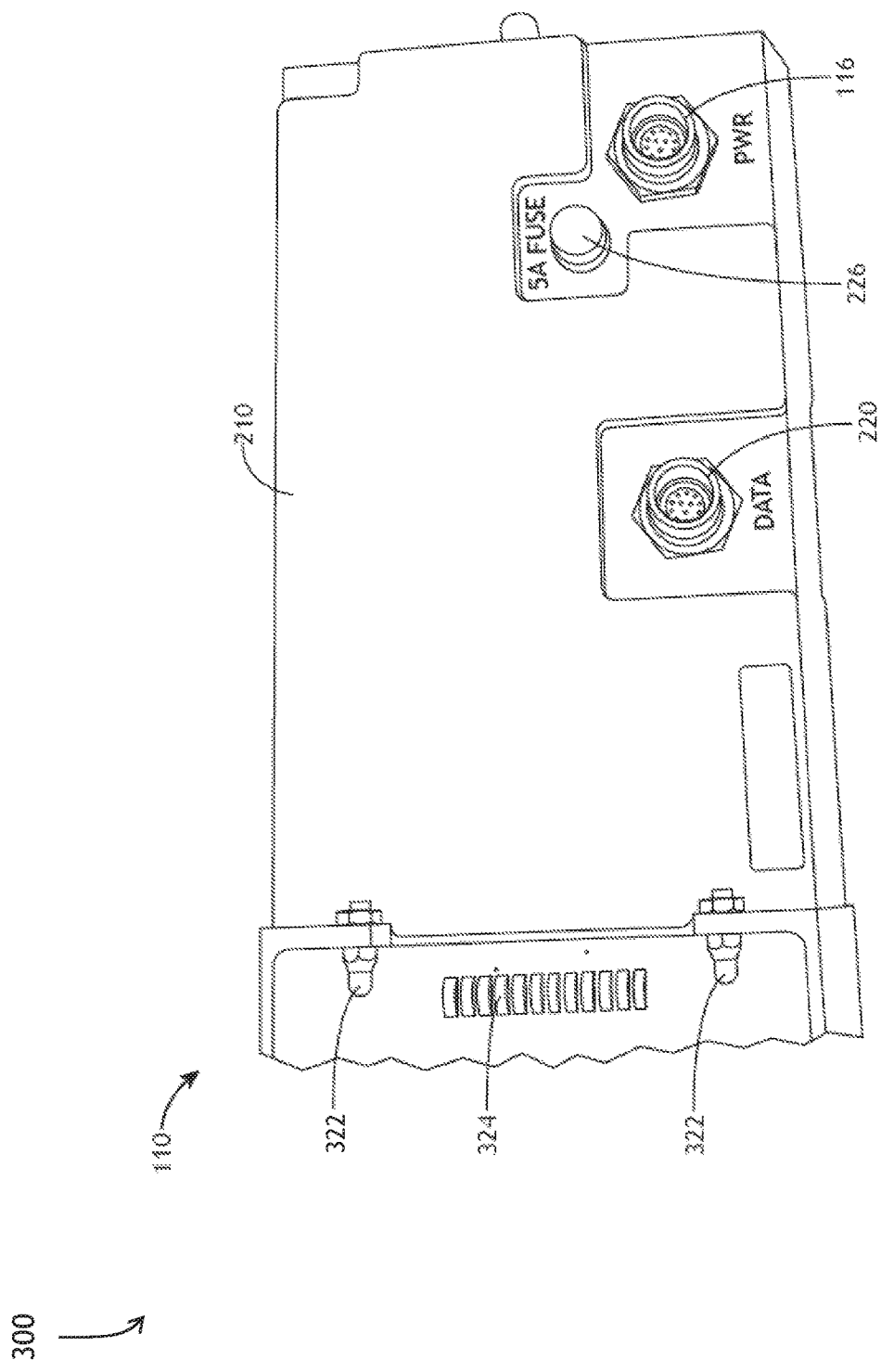
Figure 3C:
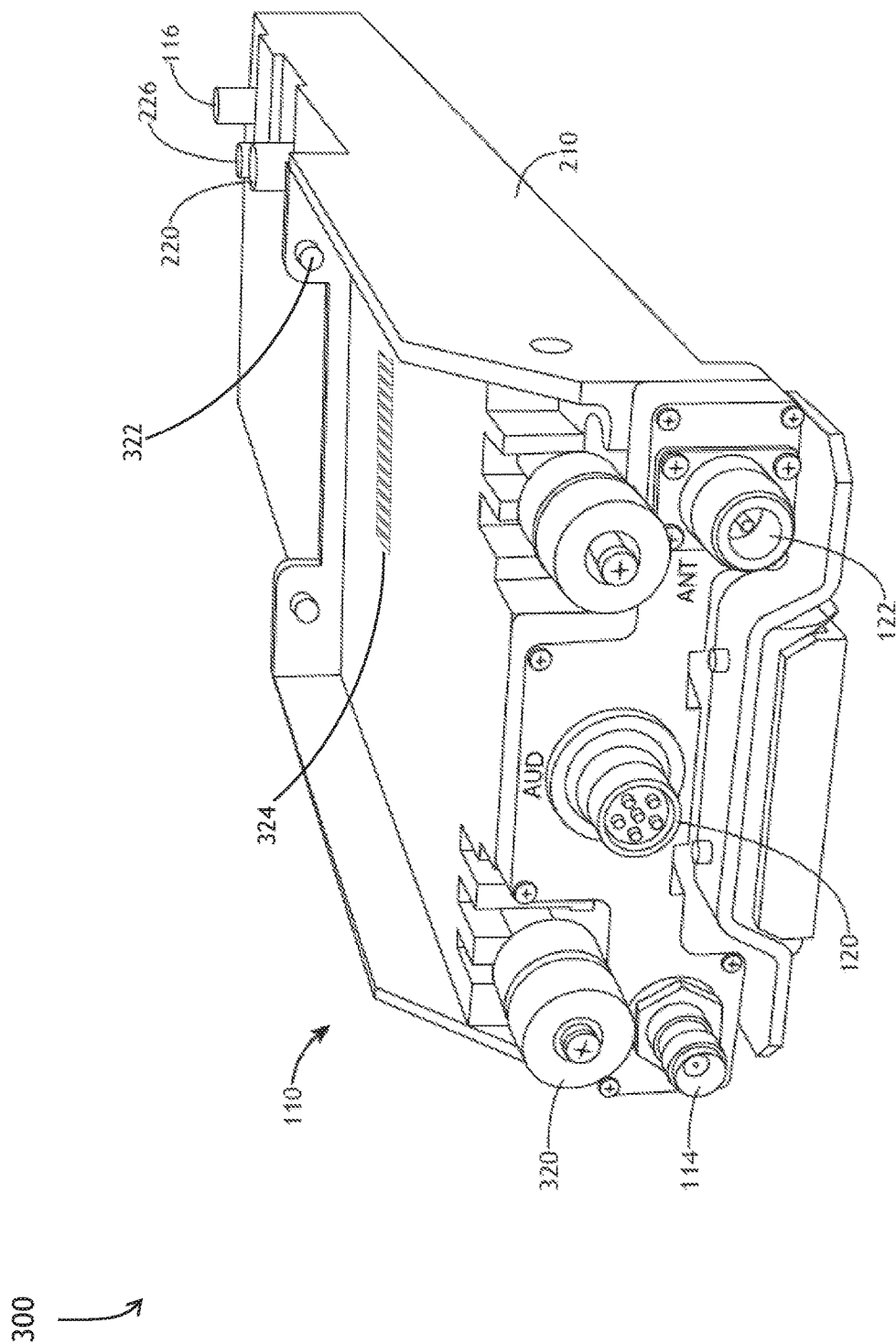

FIG. 3A-3C External Views

Referring now to FIGS. 3A-3C, views of a smart radio mount exemplary of an embodiment of the inventive concepts disclosed herein are shown. External view 300 may reveal one desired form factor of the smart radio mount 110 with limited external dimensions in length 250 width 252 and height 254. The external case 210 of the smart radio mount 110 may maintain an upper face 310 and a lower face 312. In embodiments, the radio 150 may mechanically couple with the smart radio mount 110 via connection points proximal with the upper face 310 and the smart radio mount 110 may couple with a platform via feet proximal with the lower face 312. In one embodiment of the inventive concepts disclosed herein, the lower face 312 may be specifically configured to couple with an aircraft avionics bay designed for a traditional aircraft radio. One example of the traditional aircraft radio may include a Link 16 sized aircraft radio.

In one embodiment of the inventive concepts disclosed herein, the smart radio mount 110 may incorporate mounting hardware capable of mechanically coupling with a desired radio. Mounting hardware may include mechanical mounting hardware as well as electrical coupling or a wireless connection for data transfer. In operation, the smart radio mount 110 may function with or without communication between the smart radio mount 110 and the mounted radio.

Proximal with the upper face 310, the smart radio mount 110 may incorporate captive retention screws 320 and alignment pins 322 to allow the radio 150 to securely mechanically couple with the smart radio mount 110. Also, as best viewed in FIG. 3B, spring retainers 324 may provide a bias to the radio 150 once mounted to reduce any vibration conduction between the smart radio mount 110 and the radio 150.

Figure 4A:
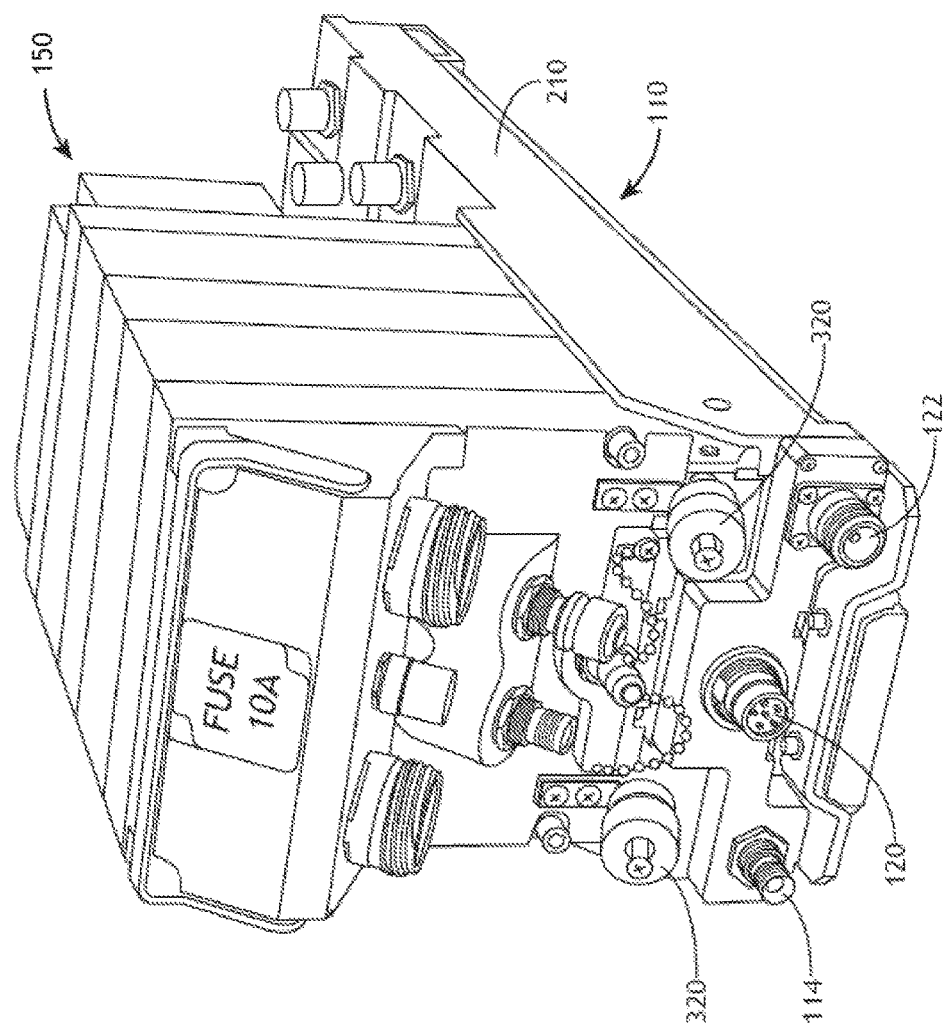
FIGS. 4A and 4B are views of a smart radio mount with a radio mounted exemplary of one embodiment of the inventive concepts disclosed herein.
Figure 4B:
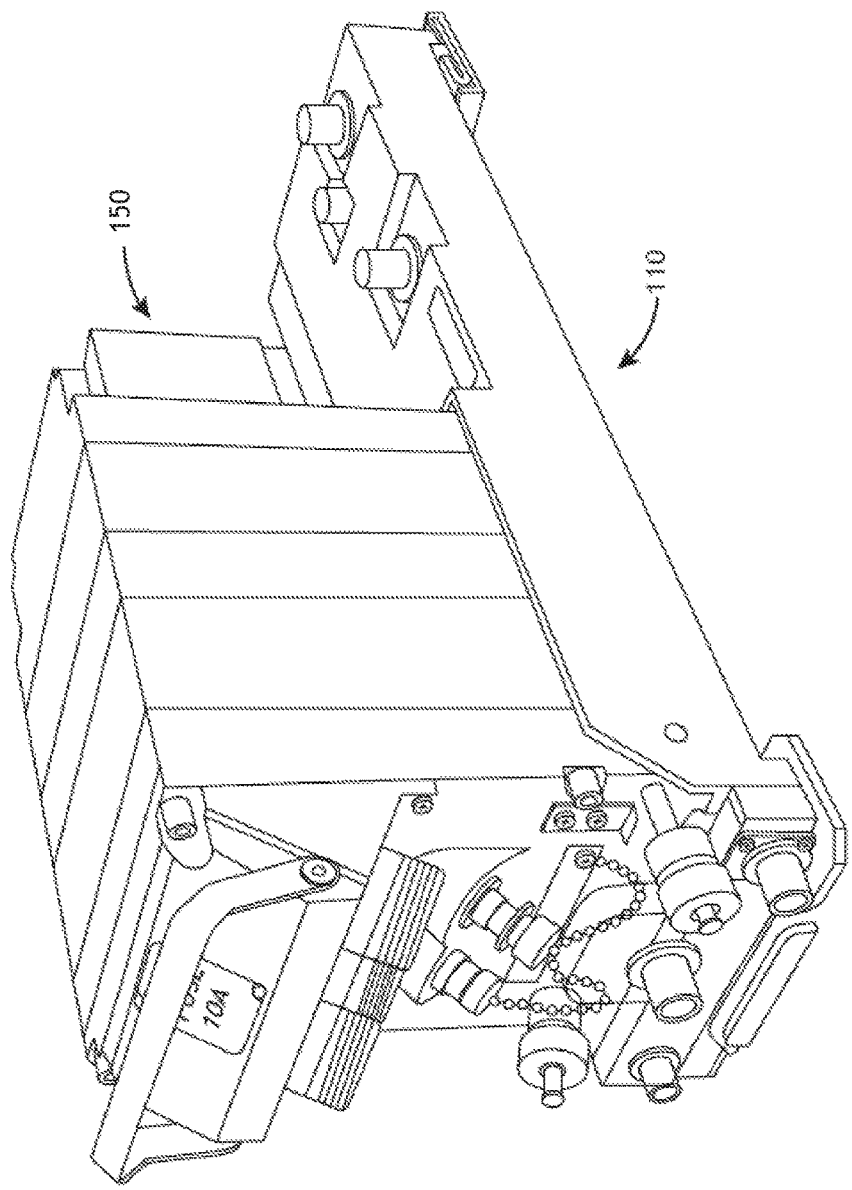

FIG. 4A-4B Radio Mounted

Referring now to FIGS. 4A and 4B, views of a smart radio mount with a radio mounted exemplary of one embodiment of the inventive concepts disclosed herein is shown. A view 400 of the mounted radio 150 may indicate a mechanical function of the smart radio mount 110. An operator may slide the radio 150 proximal with the upper face 310 and then engage the captive retention screws 320 to secure the radio to the smart radio mount 110.

In one embodiment of the inventive concepts disclosed herein, once secured the mechanical couple between the radio 150 and the smart radio mount 110 may be specifically configured to withstand a vibration and a shock in compliance with a compliance standard such as MIL-STD-810.

The smart radio mount 110 may be configured for a variety of types of radios 150. In one example the smart radio mount 110 may be configured to couple with a standard form factor radio 150 in use. Some examples of a standard form factor radio 150 may include an ARC-210 radio, a 629F-23 radio, an RT-8200, and a TTR Link 16 radio, all by Collins Aerospace.

In another example, the smart radio mount 110 may be specifically configured for coupling with additional radio types and form factors. In one embodiment of the inventive concepts disclosed herein, the smart radio mount 110 may maintain external dimension to enable the smart radio mount 110 coupled with the radio 150 to remain within a physical volume associated with a traditional airborne radio installation and maintains a combined external volume remaining within traditional airborne radio mount volume or footprint. In embodiments, the smart radio mount 110 may operate with or without a coupled radio 150.

FIG. 5 TSM Waveform

Referring now to FIG. 5, a diagram of TSM waveform characteristics usable by a smart radio mount in accordance with one embodiment of the inventive concepts disclosed herein is shown. Characteristics 500 of the TSM waveform may include the listed elements.

In one embodiment of the inventive concepts disclosed herein, the smart radio mount 110 may include a Multi-Channel Tactical Radio Networking solution via adding an exemplary 20 W TSM waveform capability to existing airborne tactical radios. The smart radio mount 110 may operate to add an Independent second TSM channel operation to the existing communication suite.

In embodiments, the smart radio mount 110 may be used as a relay for Unmanned Aircraft Systems (UAS) and mounted/dismounted TSM and compatible with PRC-148C and Special Operations Command (SOCOM) radios. The smart radio mount 110 waveform may possess AES-256 encryption and an exemplary eight Mbps throughput while supporting an exemplary 12 voice channels with simultaneous data and Position Location Identification (PLI) capabilities.

FIG. 6 Radio Types

Figure 6:
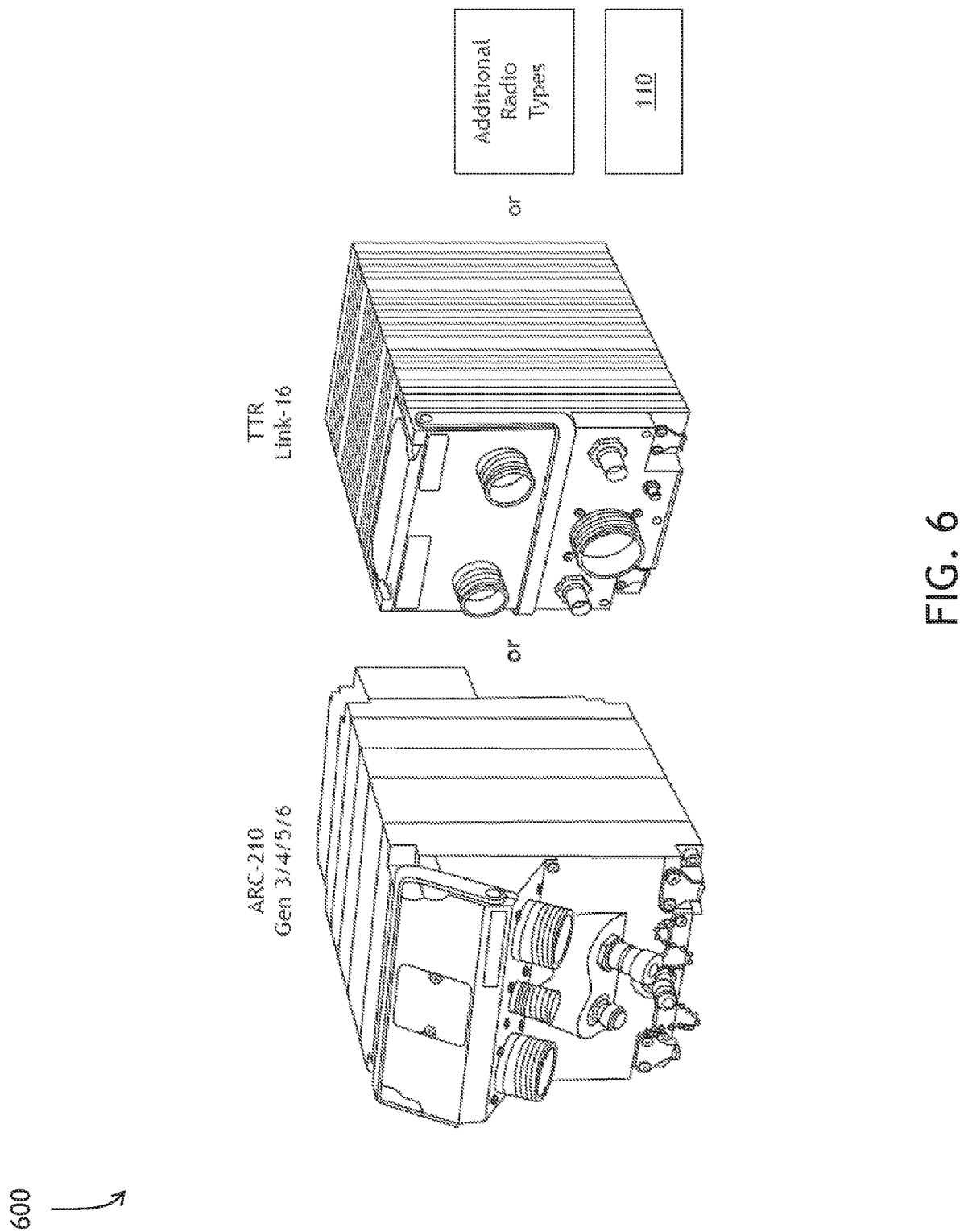
FIG. 6 is a diagram of radio types usable with a smart radio mount in accordance with one embodiment of the inventive concepts disclosed herein.

Referring now to FIG. 6, a diagram of radio types usable with a smart radio mount in accordance with one embodiment of the inventive concepts disclosed herein is shown. Diagram 600 may illustrate available radios 150 couplable with the smart radio mount 110. The smart radio mount 110 may be configured for coupling with the ARC-210 radio as well as with the TTR Link-16 radio. Contemplated herein, the smart radio mount 110 may be specifically configured to couple with a plurality of radio form factors.

In one embodiment of the inventive concepts disclosed herein, the smart radio mount 110 may be aircraft ready, audio compatible with Internal Communications (ICS) systems and Push to Talk (PTT)/Mic. The smart radio mount 110 may maintain a data interface for helicopters, UAS or fighter/attack aircraft. The smart radio mount 110 waveform may be compatible with cross domain solution devices such as, for example, M/UH-60, AH-64, M/CH-47, AH-6, MQ-1C, R/C-12 including rotary wing, fixed wing, and unmanned aircraft. The smart radio mount 110 maintains a standard 28 VDC power requirement rated for MIL-STD-704E/F and an optional MIL-STD-1275E standard for manned or unmanned aerial vehicles with RF and GPS standard connectors for aircraft antennas. In addition, the smart radio mount 110 may be configured for electromagnetic compatibility (e.g., MIL-STD-461F), EMI/EMC and MIL-STD-810G environmental standards including gunfire.

In one embodiment of the inventive concepts disclosed herein, the smart radio mount 110 may couple mechanically and/or electrically with the ARC-210 radio 150. The smart radio mount 110 may integrate within the hull of an aircraft and securely couple to the aircraft frame as well as to the ARC-210 or TTR SFF Link 16 radio.

In one embodiment of the inventive concepts disclosed herein, the smart radio mount 110 may operate separately from the desired radio and operably coupled to the platform communications suite via a wired or wireless link. The smart radio mount 110 may receive its own power and be able to transmit and receive on the additional waveform without being coupled with the desired radio. For example, the smart radio mount 110 may be incorporated with a wheeled/tracked vehicle and/or a stationary base. In this manner, the smart radio mount 110 may enable flexibility to the operator to incorporate the system in a variety of situations.

FIG. 7 ARC-210 Capabilities

Referring now to FIG. 7, a diagram of capabilities of an ARC-210 couplable with a smart radio mount associated with one embodiment of the inventive concepts disclosed herein is shown. Capabilities 700 of the ARC-210 may include the listed items. As above, the smart radio mount 110 may function with or without the radio coupled or powered.

FIG. 8 TTR Capabilities

Referring now to FIG. 8, a diagram of TTR capabilities usable by a smart radio mount exemplary of one embodiment of the inventive concepts disclosed herein is shown. Characteristics 800 of the TTR Link 16 may include the items listed.

FIG. 9 Method

Referring now to FIG. 9, a flow diagram of a method for multi-channel tactical radio networking associated with one embodiment of the inventive concepts disclosed herein is shown. A method 900 may include, at a step 902, configuring a smart radio mount to mechanically couple with each of a radio mount and a radio. The method may further include, at a step 904, with coupling the smart radio mount with the radio mount and the radio, the smart radio mount including a transceiver and a power amplifier, the transceiver configured for transmission and reception within a waveform distinct from at least one waveform capability of the radio.

CONCLUSION

As will be appreciated from the above, a smart radio mount according to embodiments of the inventive concepts disclosed herein may enable addition of an enhanced waveform to an existing radio system.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A device for adding a waveform to a communications suite, comprising:
   a smart radio mount configured to mechanically couple, on a smart radio mount lower face, with a radio mount and further configured to mechanically couple, on a smart radio mount upper face, with a radio, the smart radio mount including a global positioning interface;
   the smart radio mount including a single board computing device including a processor, an input, an output, a storage, and a memory, a transceiver, a data interface, and a power amplifier, all within an external case of the smart radio mount, the transceiver configured for transmission and reception within a waveform, the waveform distinct from at least one waveform capability of the radio, the radio is one of: an ARC-210 radio or a Tacnet Tactical Radio (TTR) Small Form Factor (SFF) Link 16 radio.

2. The device for adding a waveform to a communications suite of claim 1, wherein the radio mount is one of: a terrestrial vehicle mount and an aircraft radio mount.

3. The device for adding a waveform to a communications suite of claim 1, wherein at least one characteristic of the waveform is generated by the transceiver.

4. The device for adding a waveform to a communications suite of claim 1, wherein the smart radio mount further includes an audio interface, a radio frequency interface, and a power receptacle.

5. The device for adding a waveform to a communications suite of claim 4, wherein the power receptacle is further configured to receive a 28 VDC power supply rated for a military standard.

6. The device for adding a waveform to a communications suite of claim 1, wherein the data interface is one of an ethernet interface, a wireless data (WIFI) interface, and an interface in compliance with a MIL-STD-1553.

7. The device for adding a waveform to a communications suite of claim 1, wherein the smart radio mount is configured to operate independent of a power status of the radio.

8. The device for adding a waveform to a communications suite of claim 1, wherein the smart radio mount is configured to couple, on a smart radio mount lower face, with a radio mount designed to receive an aircraft radio.

9. The device for adding a waveform to a communications suite of claim 1, wherein the smart radio mount is configured to withstand a vibration and a shock in compliance with MIL-STD-810.

10. The device for adding a waveform to a communications suite of claim 1, wherein the waveform is at least one of: a tactical scalable mobile ad hoc network waveform (TSM), a satellite-based communication waveform, and a waveform designed for use by a public safety organization.

11. The device for adding a waveform to a communications suite of claim 1, wherein the power amplifier is at least an approximately 20-watt power amplifier.

12. The device for adding a waveform to a communications suite of claim 1, wherein the smart radio mount maintains a size of approximately 5.36 inches width, approximately 19.2 inches depth, and approximately 2.11 inches height.

13. A system for multi-channel tactical radio networking, comprising:
  a smart radio mount configured to mechanically couple, on a smart radio mount lower face, with a vehicle radio mount and further configured to mechanically couple, on a smart radio mount upper face, with a radio, the smart radio mount including a global positioning interface;
  the radio maintaining a portion of a vehicle communication suite; and
  the smart radio mount including a single board computing device including a processor, an input, an output, a storage, and a memory, a transceiver, a data interface, and a power amplifier, all within an external case of the smart radio mount, the transceiver configured for transmission and reception within a waveform distinct from at least one waveform capability of the vehicle communication suite, the radio is one of: an ARC-210 radio or a Tacnet Tactical Radio (TTR) Small Form Factor (SFF) Link 16 radio.

14. The system for multi-channel tactical radio networking of claim 13, wherein an external case of the smart radio mount further includes at least one of: a radio frequency interface, an audio interface, a data control interface and a power receptacle.

15. The system for multi-channel tactical radio networking of claim 13, wherein the smart radio mount lower face further includes at least two feet configured to couple with the radio mount.

16. The system for multi-channel tactical radio networking of claim 13, wherein the smart radio mount further includes at least one of: a pair of captive retention screws, an alignment pin, and a spring retainer configured for securing the radio.

* * * * *